Patented Feb. 12, 1952

2,585,609

UNITED STATES PATENT OFFICE 2,585,609

MANUFACTURE OF ALPHA SODIUM TETRASILICATE

John H. Wills, Chester, Pa., assignor to Philadelphia Quartz Company, Philadelphia, Pa., a corporation of Pennsylvania No Drawing. Application February 16, 1948,
Serial No. 8,742

5 Claims. (Cl. 23—110)

This invention relates to manufacture of alpha sodium tetrasilicate; and it comprises a method of making an alpha or high-temperature form of sodium tetrasilicate wherein a concentrated aqueous solution of sodium silicate, having a ratio of $SiO_2$ to $Na_2O$ within the range of about 2 : 1 to 4 : 1 and a concentration within the range of about 1 per cent to 45 per cent $SiO_2$ by weight, is maintained within a temperature range of about 100° to 150° C. for a time sufficient to produce crystals of alpha sodium tetrasilicate; said solution being advantageously seeded at the start of the heating step with sodium tetrasilicate crystals; followed by recovery of the crystals of alpha sodium tetrasilicate thus formed. The product of this invention comprises a finely divided crystalline product in which the crystals in their longest dimension measure from about 1 to 50 microns, most of said crystals being in the form of orthorhombic plates, a small proportion of acicular or needle-like crystals being sometimes present, said crystals being either uniaxial or if biaxial beta and gamma being practically identical, whose elongation is gamma and extinction parallel, wherein alpha equals 1.471 plus or minus 0.002 and gamma equals 1.485 plus or minus 0.002; the composition of said crystals being about 1 $Na_2O$ : 4.2–4.4 $SiO_2$ : 3.5–4.5 $H_2O$ when dried at 105° C. said product being stable even when heated for short periods at temperatures up to 150° C.; all as more fully hereinafter set forth and as claimed.

In a prior patent, No. 2,179,806, Walter F. Wegst and I have described a hydrated sodium tetracsilicate which can be produced by heating solutions of sodium silicate, containing more $SiO_2$ than that represented by the ratio $$2\ SiO_2 : 1\ Na_2O$$

to temperatures ranging from about 60° to 90° C. The patent indicates that the sodium tetrasilicate crystals will form spontaneously in such a solution if heated to about 75° to 85° C. but that this takes a period of two months or so, in view of which fact seeding of the solution with crystals obtained previously is recommended. The statement is made that the tetrasilicate crystals lose water rapidly at temperatures above about 80° C. It is evident from the specific examples of the patent that the rate of production of the crystals in the manner described is extremely slow, so slow in fact as to be commercially unattractive.

I have now discovered that a crystalline tetrasilicate of very similar, if not identical chemical composition but of quite different and more advantageous physical properties can be produced by raising the temperature of the silicate solution above those recommended in the acknowledged patent. This new tetrasilicate forms spontaneously within a period of two or three days in sodium silicate solutions maintained at temperatures within the range of about 100° to 150° C., having a ratio of $SiO_2$ to $Na_2O$ within the range of about 2 : 1 to 4 : 1 and concentrations of $SiO_2$ within the range of about 10 to 40 per cent by weight. Rapid growth is obtained in these solutions after the spontaneous formation of the crystals provided that these solutions are maintained within the temperature range stated. After a supply of these crystals has been obtained it is possible to seed the silicate solutions and thus greatly increase the rate of production. The alpha sodium tetrasilicate crystals can be grown in seeded solutions having a range of gravities of from about 10° to 70° Bé. or concentrations ranging from about 1 to 45 per cent $SiO_2$.

Over a temperature range of from about 90° to 100° C. it is possible to produce from one and the same silicate solution either the product described in the patent or the new tetrasilicate, depending upon which type of seed is added to the solution. But at temperatures of about 100° C. and above the new tetrasilicate is formed exclusively and is the stable form. The new tetrasilicate can be obtained at temperatures above 100° C. even when the silicate solution is seeded with the older form. Apparently the older form becomes converted into the new form under these conditions.

It will be noted that my new tetrasilicate has a refractive index which differs considerably from that described in the acknowledged patent and I have also found that the X-ray diffraction patterns of the two products are distinctly different although some parts of the spectrum are quite similar. These facts show that the two tetrasilicates are different crystallographic substances. But they do have the same chemical analysis, at least within the experimental errors involved in present analytical methods. These facts indicate that the new tetrasilicate is a high temperature isomer of the earlier described form. According to established practice therefore the new form should be termed alpha sodium tetrasilicate while the older form should be called beta sodium tetrasilicate. The new tetrasilicate is obviously not merely another crystalline hydrate of the older type since the water contents of the two forms are approximately the same.

While the ratio of $Na_2O$ to $SiO_2$ in the new silicate is about 1:4.3 rather than 1:4, it is believed to be proper and reasonable to call it a tetrasilicate thereby continuing in use the established name. No other sodium silicate crystals have been reported which have a better claim to the name tetrasilicate. In contrast two potassium tetrasilicates are known. The new silicate has some of the properties of a so-called solid solution, such as a complex ratio, loss of water on heating, etc., but the fact that no important differences have been detected among different samples in refractive indices and X-ray diffraction data seems to prove that it is a true chemical compound and not a mixed crystal or solid solution.

As indicated above the new alpha sodium tetrasilicate has physical properties which are not only different from but also much more advantageous than those of the beta sodium tetrasilicate. An outstanding difference between the two forms consists in the different form of their crystals. While the beta form occurs in acicular or needle-like crystals my alpha form is characterized by the rectangular plate-like form of its crystals. The plate-like form of its crystals makes this alpha sodium tetrasilicate particularly suited for use as a filler or flatting agent in paints. The covering power of paints made with the alpha form is substantially greater than that of paints made with the beta form. The plate-like crystals also serve to protect the surface beneath and, since the product produces a pH of about 10 when contacted with water, paints containing this product as a filler form excellent corrosion resistant paints.

A still more important difference between the two tetrasilicates is that while the beta form loses water rather rapidly when heated to temperatures above 80° C. the new alpha form is stable when heated up to about 150° C. which range includes the molding temperatures of most of the present-day plastics. Moreover the refractive indices of the alpha tetrasilicate are closer together and therefore it exhibits less birefringence and plastics containing the same as a filler are more transparent.

As indicated above, alpha sodium tetrasilicate crystals can be formed spontaneously within a period of a few days whereas, in contrast, the beta form requires two or more months to form spontaneously. The alpha form also has a rate of growth which is from about 5 to 10 times greater than the beta form. This substantially reduces the cost of production. Other factors which reduce the cost of production are that the alpha type crystals filter much more readily from and retain less of the mother liquor.

The alpha type of crystals can be produced from silicate solutions of any type wherein the ratio of $SiO_2$ to $Na_2O$ is above about 2:1 provided that the concentration is sufficient and the temperature is held above 100° C. The rate of growth of the crystals depends upon the silicate ratio, the concentration, the temperature and the viscosity. Other things being equal the higher the concentration and the higher the silicate ratio the greater the rate of growth. However, the increase in viscosity obtained at higher concentrations and silicate ratios tends to retard the growth, so the maximum rate of growth is obtained at intermediate values of both concentration and silicate ratio. Increase of temperature within the range of 100° to about 150° C. generally increases the rate of production but temperatures above 150° C. must be avoided since alpha quartz crystals precipitate at these temperatures.

My invention can be explained in greater detail by reference to the following specific examples which represent practical embodiments of my process of preparing the new alpha sodium tetrasilicate.

EXAMPLE 1

I dissolved in 292,000 pounds of water 126,000 pounds of anhydrous sodium silicate glass containing 23.5 per cent $Na_2O$ and having a weight ratio of 3.22 $SiO_2$ to 1 $Na_2O$. This produced a solution having a gravity of about 32–33° Bé. This liquor was then heated and maintained within the temperature range of 100° to 110° C. Alpha sodium silicate formed spontaneously and by the third day the solution was producing alpha sodium tetrasilicate at the rate of about 6,000 pounds a day. This was separated from the residual cullet by a differential settling process and a product consisting of about 95 per cent alpha sodium tetrasilicate was obtained in crystals ranging in size from about 2 to 50 microns in their longest dimension. Some of the crystals appeared to be grey and others white but hand picked samples of each type showed substantially identical analyses as well as refractive indices after drying at 105° C. The two analyses were:

|  | White Crystals | Grey Crystals |
| --- | --- | --- |
| $Na_2O$ | 15.28 | 15.75 |
| $SiO_2$ | 62.42 | 64.07 |
| $H_2O$ (Ignited) | 21.10 | 19.19 |
| Residue | 1.31 | 1.51 |
|  | 100.11 | 100.50 |

It will be noted that the above crystals contained about 20 per cent of water after drying at 105° C. The loss of water at this temperature was negligible. In contrast beta sodium tetrasilicate retains less than 6 per cent of water after drying at 100° C. The stability upon heating of the alpha type in contrast to the beta type is one of the outstanding and surprising differences between the two types of crystals. And it is this stability which enables the alpha type to be used in several important industrial applications for which the beta type would be totally unsuited owing to its tendency to lose water upon heating.

EXAMPLE 2

In this example 1500 pounds of a commercial sodium silicate solution, having a weight ratio of 3.22 $SiO_2$:1 $Na_2O$, an $Na_2O$ content of 8.90 per cent and a gravity of 41° Bé. at 20° C. was heated within the temperature range of 114°–122° C. after being seeded with 200 pounds of alpha sodium tetrasilicate crystals obtained in a previous operation similar to that of Example 1. The liquid phase was analyzed for its weight ratio of $SiO_2$:$Na_2O$ in order to estimate the production of alpha sodium silicate crystals with the following results:

|  | Silicate Ratio | Tetrasilicate Produced |
| --- | --- | --- |
|  |  | Lbs. |
| 2 days | 3.03 | 38 |
| 7 days | 2.72 | 107 |
| 10 days | 2.45 | 155 |

EXAMPLE 3

1500 pounds of another sodium silicate solution, having a weight ratio of 3.23 $SiO_2$:1 $Na_2O$, containing 7.95 per cent of $Na_2O$ and having a gravity of 37.3° Bé. at 20° C. was held at a temperature of about 120° C. after being seeded with alpha sodium tetrasilicate crystals. From an analysis of the silicate ratio of the solution it was estimated that 20 pounds of alpha tetrasilicate crystals had formed in 24 hours and 54 pounds in a six day period. In this test vapor was allowed to escape from the solution. This increased the viscosity and thus slowed down the rate of production of crystals.

EXAMPLE 4

In this example 2900 grams of the silicate solution used in Example 3 were seeded with 325 grams of an aqueous magma containing about 20 per cent of beta sodium tetrasilicate crystals, prepared as described in Patent No. 2,179,806. This mixture was held at a temperature of about 110° C. for a period of 24 hours. The crystals of alpha sodium tetrasilicate formed in this manner were filtered off, washed and dried. The weight of crystals recovered was found to be 115 grams. Microscopic examination showed that the original crystals of beta sodium tetrasilicate had been converted into alpha sodium tetrasilicate. The crystals were as uniform with respect to size, shape and refractive indices as crystals obtained from operations in which alpha sodium tetrasilicate seed crystals were employed.

EXAMPLE 5

In this example a continuous run was conducted over a period of three weeks in which the crystallization bath was replenished each day with water and with the silicate of soda glass used in Example 1. The run was started by seeding 314 cubic feet of the sodium silicate solution of Example 3 with 200 pounds of alpha sodium tetrasilicate crystals. About 12,700 pounds of glass and 20,900 pounds of water were added each day. The gravity varied from about 21 to 43° Bé. during the run and the temperature was maintained close to 100° C. The alpha sodium tetrasilicate formed was removed daily and separated from residual sand and cullet by differential settling. A total yield of about 5,000 pounds was obtained over the three weeks period of the run. A sample of the product was washed with hot water, acetone and finally with ether. The wash water was opalescent indicating that some fine particles had been washed out. The remaining particles varied in size from about 2 to 5 microns in diameter. After drying for 3 hours at 70° C., the refractive indices of the product were measured and found to be 1.472±0.002 and 1.487±0.003. The analysis after drying as described was:

| | |
|---|---|
| $Na_2O$ | 15.06 |
| $SiO_2$ | 64.02 |
| $H_2O$ | 18.52 |
| $R_2O_3$ | 2.27 |
| Total | 99.87 |

It has already been mentioned that alpha sodium tetrasilicate is adapted to be used as a filler in the molding of various synthetic thermoplastic resins. My tests show that it can be used with any of the synthetic resins which can be molded at temperatures below about 300° F. without decomposing sufficiently to cause difficulties. It is especially useful in the production of filled resins which are transparent or translucent. The following two examples show the results obtained using the tetrasilicate as a filler in two well known resins. For comparison purposes tests were also made using beta sodium tetrasilicate as a filler.

EXAMPLE 6

300 grams of a commercial methyl methacrylate molding powder were worked into a plastic film on a Banbury mixer. The surface temperature of the front roll was 300° F. and that of the back roll 270° F. 10 grams of alpha sodium tetrasilicate were then milled into the plastic. After the tetrasilicate had been worked in thoroughly the film was removed and cooled and samples were cut off and molded in the form of discs for 5 minutes at about 1500 pounds per square inch pressure at 280° F. The molded discs thus produced were examined under the microscope. The index of the molded plastic material itself was 1.488 and the discs were found to be transparent. The particles of tetrasilicate embedded in the plastic were found to be still birefringent and no evidence was found that any decomposition had taken place. The refractive index of the molded plastic was so close to that of the tetrasilicate crystals that the latter were scarcely visible to the naked eye.

In a comparative test exactly the same procedure was followed except that beta sodium tetrasilicate crystals were employed as filler in place of the alpha type crystals. It is found that considerable spattering caused by loss of moisture occurred as the crystals were worked into the plastic on the Banbury. This was not noticeable in the other test. The molded discs produced were definitely less transparent than in the preceding test. Under the microscope the particles of filler appeared to have a lower index than that of the plastic. Most of the particles appeared to have decomposed and had lost their birefringence. In fact the only particles exhibiting birefringence were those present in aggregates which had remained undispersed. It was evident from these two tests that, while alpha sodium tetrasilicate is well suited as filler under the conditions used in these tests, the beta type of crystals are unsuited for such purpose.

EXAMPLE 7

In this test a liquid polyester-styrene resin was employed having a setting temperature of 200° F. and a refractive index of 1.54. 70 grams of alpha sodium tetrasilicate were thoroughly mixed with 400 grams of the resin. The mixture was poured into a heated mold and held at a temperature of about 220° F. for about 20 minutes without pressure. There was no evidence of escaping vapor. When the molded plate had cooled a sample was studied under the microscope and it was found that the particles of tetrasilicate were still birefringent showing that no decomposition had taken place. The plate was translucent rather than transparent owing to the large difference between the refractive indices of the filler and plastic but the article was pleasing in appearance and had a grey color.

In a comparative test the same procedure was followed except for the fact that beta sodium tetrasilicate crystals were substituted for the alpha type used previously. During the molding operation there was considerable boiling around the edges of the cover of the mold indicating loss of moisture. The molded plate obtained was white in color and opaque. Upon examination under the microscope it was found that the tetrasilicate particles had lost their birefringence owing to decomposition caused by the heating operation.

Somewhat similar tests with cellulose acetate showed that the alpha form of sodium tetrasilicate can be used as a filler in the molding of this plastic but that the beta form decomposes and discolors the plastic, turning it to a brown color. This is undoubtedly due to the release of moisture having alkaline reaction due to hydrolysis of the tetrasilicate.

It has been found that the transparency of molded thermoplastic resins, in which alpha tetrasilicate is incorporated as a filler, can be improved by the use of a plasticizer, such as diethyl phthalate, benzyl trimethylammonium hydroxide, dibutyl phthalate, triethylene glycol di-2-ethylbutyrate and diphenyl (o-chlorphenyl) phosphate. Plasticizers of this type seem to act as wetting agents since they tend to prevent the formation of air films between filler and plastic.

EXAMPLE 8

It has been mentioned that the new alpha sodium tetrasilicate is of particular utility as an anti-corrosion and flatting agent in coating compositions of various types. It requires the presence of only a small amount of the tetrasilicate in a paint, for example, to produce corrosion resistance. Usually from about 2 to 15 per cent by weight is sufficient. Of course any additional amount can be used up to 100 per cent of the pigment, if desired. The corrosion-resistant effect is apparently due to the slight alkalinity produced by the tetrasilicate in the presence of moisture.

One typical paint formula employing the new tetrasilicate is as follows:

*Composition of pigment*

|  | Per cent |
|---|---|
| Lithopone | 75 |
| Magnesium silicate | 10 |
| Alpha sodium tetrasilicate | 15 |
|  | 100 |

This pigment is mixed with a liquid vehicle in the proportions of about 65 per cent pigment and 35 per cent vehicle. The vehicle may comprise a drying or semi-drying oil of any conventional type, such as an alkali treated linseed oil or sunflower oil or an aqueous vehicle can be used to make a water paint. While some acid vehicles can be employed it is best to use vehicles which are inert, that is either neutral or slightly alkaline in reaction in order to prevent reaction with the alkali of the tetrasilicate.

The lithopone in the above pigment produces opacity and can be replaced by any other pigment. The magnesium silicate gives toughness and acts as a suspending agent while the tetrasilicate contributes both flatting characteristics and corrosion resistance. The proportions of the various components can, of course, be varied within the skill of the art.

EXAMPLE 9

Alpha sodium tetrasilicate can also be used as a filler in transparent or translucent varnishes. A typical varnish of this type has the following formula:

100 pounds of resin
3.5 pounds of alpha sodium tetrasilicate
1.5 pounds of manganese borate
12 gallons of oil
34 gallons of thinner or solvent mixture The resin employed, if a transparent varnish is desired, should have a refractive index close to 1.48 and it must, of course, be resistant to alkali. Any resin of this type is suitable. Examples are methyl methacrylate and polyvinyl butyral resins. The oil in the above formula may be sunflower oil or an alkali treated linseed oil or any other drying oil which is neutral and inert towards alkalis. The thinner to be used will depend, of course, on the particular resin used. The varnish is compounded in accordance with conventional practices but during and after incorporation of the tetrasilicate the mix should not be heated to temperatures exceeding about 250° C. in order to avoid loss of moisture from the tetrasilicate. The varnish described produces a hard, transparent, corrosion-resistant flat finish.

While I have described what I consider to be the most advantageous methods of preparing my alpha sodium tetrasilicate and ways of using the same, it is evident of course that various modifications can be made in the specific procedures described without departing from the purview of this invention. The particular and distinctive properties of the new tetrasilicate enable it to be used in many industrial applications aside from those already mentioned for which the beta type would be totally unsuited. One such use is in the stabilization of halogenated polyethylenes. When my tetrasilicate is incorporated in these resins it suppresses the evaporation of the hydrohalide when the resin is heated. It is possible to vary the particle size of the tetrasilicate crystals by control of viscosity and temperature of the silicate solutions used in their manufacture to produce particles particularly suited for special uses. In this way particles ranging in size all the way from about 1-2 microns up to about 50 microns in their largest dimension can be obtained. The new tetrasilicate has cation exchanging properties, that is, the sodium content can be replaced by hydrogen or by metals or other cations. In this manner valuable pigments, insecticides and catalysts, for example, can be produced, as described in my copending application, Serial No. 7,303, filed February 9, 1948. Its cation exchanging property makes the new tetrasilicate a valuable therapeutic agent for control of stomach acidity and for treating stomach ulcers. The product is also useful as a hardening agent in concrete. The new tetrasilicate can also be used as a fusible form of silica in baked enamels. Its alkaline reaction upon contact with water renders it useful as a cleaning agent either alone or admixed with other ingredients. If desired, during manufacture of alpha sodium tetrasilicate crystals, temperatures at or above the boiling points of the silicate solutions can be employed, within the range of 100° to 150° C. If boiling point temperatures or temperatures close to the boiling point are used it is advantageous to employ a reflux condenser to return the water lost by evaporation while pressure apparatus must be employed, of course, if temperatures above the boiling point are used. Various other uses for my product and other ways of modifying the processes and products which have been described will be immediately evident to those skilled in the art.

What I claim is:

1. As a new product, alpha sodium tetrasilicate in the form of clear crystals having a particle size ranging from about 1 to 50 microns in their largest dimension, most of the crystals being in the form of orthorhombic plates, a small proportion of acicular or needle-like crystals being sometimes present, said crystals being either uniaxial or if biaxial beta and gamma being practically identical, whose elongation is gamma and extinction parallel, wherein alpha equals $$1.471 \pm 0.002$$

and gamma equals $1.485 \pm 0.002$, the composition of said crystals being about 1 $Na_2O$:4.2–4.4 $SiO_2$:3.5–4.5 $H_2O$ when dried at 105° C. and being substantially stable when heated for short periods to temperatures close to 150° C.

2. In the manufacture of alpha sodium tetrasilicate crystals, the process which comprises agitating and heating at temperatures within the range of about 100° to 150° C. an aqueous sodium silicate solution having a silicate ratio of $SiO_2$ to $Na_2O$ within the range of about 2:1 to 4:1 and a concentration within the range of about 10 to 40 per cent by weight, for a time sufficient to form crystals of alpha sodium tetrasilicate.

3. In the manufacture of alpha sodium tetrasilicate crystals, the process which comprises preparing a concentrated aqueous sodium silicate solution containing more $SiO_2$ relative to $Na_2O$ than that corresponding to a $SiO_2$:$Na_2O$ ratio of 2:1 and having a concentration within the range of about 1 to 45 per cent $SiO_2$ by weight, seeding the solution with alpha sodium tetrasilicate crystals, agitating and heating within the temperature range of about 100° to 150° C., recovering the alpha sodium tetrasilicate crystals thereby produced and replenishing the solution with sodium silicate substantially at the rate it is exhausted therefrom by formation of the alpha sodium tetrasilicate crystals.

4. In the manufacture of alpha sodium tetrasilicate crystals, the process which comprises adding crystals of sodium tetrasilicate to an aqueous solution of sodium silicate having a ratio of $SiO_2$ to $Na_2O$ between about 2:1 to 4:1 and a concentration within the range of about 1 to 45 per cent by weight, heating and agitating the mixture at temperatures within the range of about 100° to 150° C. for at least 24 hours sufficient to produce crystals of alpha sodium tetrasilicate and recovering the latter from the solution.

5. In the manufacture of alpha sodium tetrasilicate crystals, the process which comprises heating and agitating at a temperature within the range of about 100° to 150° C. an aqueous solution of sodium silicate having a ratio of $SiO_2$ to $Na_2O$ within the range of about 2:1 to 4:1 and a concentration within the range of about 1 to 45 per cent by weight, seeding said solution with crystals of alpha sodium tetrasilicate having a composition of about 1 $Na_2O$:4.2–4.4 $SiO_2$:3.5–4.5 $H_2O$ and recovering the crystals of alpha sodium tetrasilicate produced in said solution.

JOHN H. WILLS.

REFERENCES CITED

The following references are of record in the file of this patent:

UNITED STATES PATENTS

| Number | Name | Date |
|---|---|---|
| Re. 23,043 | Wegst et al. | Oct. 5, 1948 |
| 2,179,806 | Wegst et al. | Nov. 14, 1939 |
| 2,344,733 | Ripper | Mar. 21, 1944 |